(12) United States Patent
Krampe et al.

(10) Patent No.: US 9,347,211 B2
(45) Date of Patent: May 24, 2016

(54) SUCTION COUPLING

(75) Inventors: Paul Krampe, Essen (DE); Hans Rainer Hesler, Bakum (DE)

(73) Assignee: Hugo Vogelsang Maschunenbau GmbH, Essen (DE)

(*) Notice: Subject to any disclaimer, the term of this patent is extended or adjusted under 35 U.S.C. 154(b) by 73 days.

(21) Appl. No.: 13/981,091

(22) PCT Filed: Dec. 23, 2011

(86) PCT No.: PCT/EP2011/073930
§ 371 (c)(1),
(2), (4) Date: Aug. 23, 2013

(87) PCT Pub. No.: WO2012/100890
PCT Pub. Date: Aug. 2, 2012

(65) Prior Publication Data
US 2013/0327406 A1     Dec. 12, 2013

(30) Foreign Application Priority Data
Jan. 27, 2011    (DE) .................... 20 2011 002 009 U

(51) Int. Cl.
*B61D 35/00*     (2006.01)
*E03F 7/00*     (2006.01)

(52) U.S. Cl.
CPC ............... *E03F 7/00* (2013.01); *B61D 35/007* (2013.01); *Y02T 30/30* (2013.01); *Y10T 137/0318* (2015.04); *Y10T 137/8593* (2015.04)

(58) Field of Classification Search
USPC ...................... 137/1, 205, 557, 563
See application file for complete search history.

(56) References Cited

U.S. PATENT DOCUMENTS

| | | | | |
|---|---|---|---|---|
| 4,184,506 A | * | 1/1980 | Varis et al. | 137/205 |
| 4,621,379 A | * | 11/1986 | Kilpi | 4/431 |
| 4,691,731 A | * | 9/1987 | Grooms et al. | 137/205 |

(Continued)

FOREIGN PATENT DOCUMENTS

| | | |
|---|---|---|
| CN | 1383410 A | 12/2002 |
| DE | 3922969 A1 | 1/1991 |

(Continued)

OTHER PUBLICATIONS

International Search Report dated Mar. 15, 2012 in Application No. PCT/EP2011/073930.

(Continued)

*Primary Examiner* — John Fox
(74) *Attorney, Agent, or Firm* — Kilpatrick Townsend & Stockton LLP; Dean W. Russell

(57) ABSTRACT

The invention relates to a suction device (1) for removing a mixed fluid, in particular fecal matter, from a collecting tank (2), in particular from a sewage tank of a railway vehicle, comprising a mixed fluid inlet (4) for receiving the mixed fluid, said mixed fluid inlet (4) being fluidically connectable to a connection port of said collecting tank (2), a mixed fluid outlet (8) for discharging the mixed fluid, said mixed fluid outlet (8) being fluidically connectable to a suction line, and a flow channel (14) extending between said inlet and said outlet.
The invention relates in particular to a constriction member (10) which is adapted to reduce a cross-section of the flow channel (14) in sections thereof or along the entire length thereof.
The invention further relates to a suction station for removing a mixed fluid, and to such a method.

15 Claims, 12 Drawing Sheets

(56) References Cited

U.S. PATENT DOCUMENTS

| | | | | |
|---|---|---|---|---|
| 5,280,872 | A * | 1/1994 | Yamanaka | 251/61.5 |
| 5,487,646 | A * | 1/1996 | Ushitora et al. | 417/4 |
| 5,575,304 | A * | 11/1996 | Hassett | 137/1 |
| 5,575,454 | A * | 11/1996 | Ushitora et al. | 251/61.5 |
| 5,628,344 | A | 5/1997 | Roberts | |
| 5,829,471 | A * | 11/1998 | Hofseth | 137/205 |
| 5,918,853 | A * | 7/1999 | Yamabe et al. | 251/61.5 |
| 5,971,005 | A * | 10/1999 | McKiernan et al. | 137/205 |
| 5,979,486 | A * | 11/1999 | Davidson | 137/205 |
| 6,131,596 | A * | 10/2000 | Monson | 137/14 |
| 6,240,986 | B1 | 6/2001 | Berkes et al. | |
| 6,298,870 | B1 * | 10/2001 | Ohtsuka et al. | 137/205 |
| 6,397,874 | B1 * | 6/2002 | Featheringill et al. | 137/14 |
| 6,467,494 | B1 * | 10/2002 | Kolb et al. | 137/12 |
| 6,467,497 | B1 * | 10/2002 | Stradinger et al. | 137/205 |
| 7,013,909 | B2 * | 3/2006 | Shimizu et al. | 137/205 |
| 7,124,769 | B2 * | 10/2006 | Sansom et al. | 137/14 |

FOREIGN PATENT DOCUMENTS

| | | |
|---|---|---|
| DE | 4335945 C2 | 5/1995 |
| DE | 10216091 C1 | 8/2003 |
| DE | 8524288 U1 | 11/2005 |
| DE | 202004019308 U1 | 4/2006 |
| DE | 202004019308 U1 | 5/2006 |
| DE | 102007011210 B3 | 4/2008 |
| EP | 0675987 B1 | 7/1999 |
| JP | 11281000 A | 10/1999 |
| WO | 9511354 | 4/1995 |
| WO | 9636832 A1 | 11/1996 |
| WO | 2008107177 A1 | 9/2008 |

OTHER PUBLICATIONS

Chinese Patent Application No. 201180066071.6, Office Action (and English Translation) dated Jan. 12, 2015.

* cited by examiner

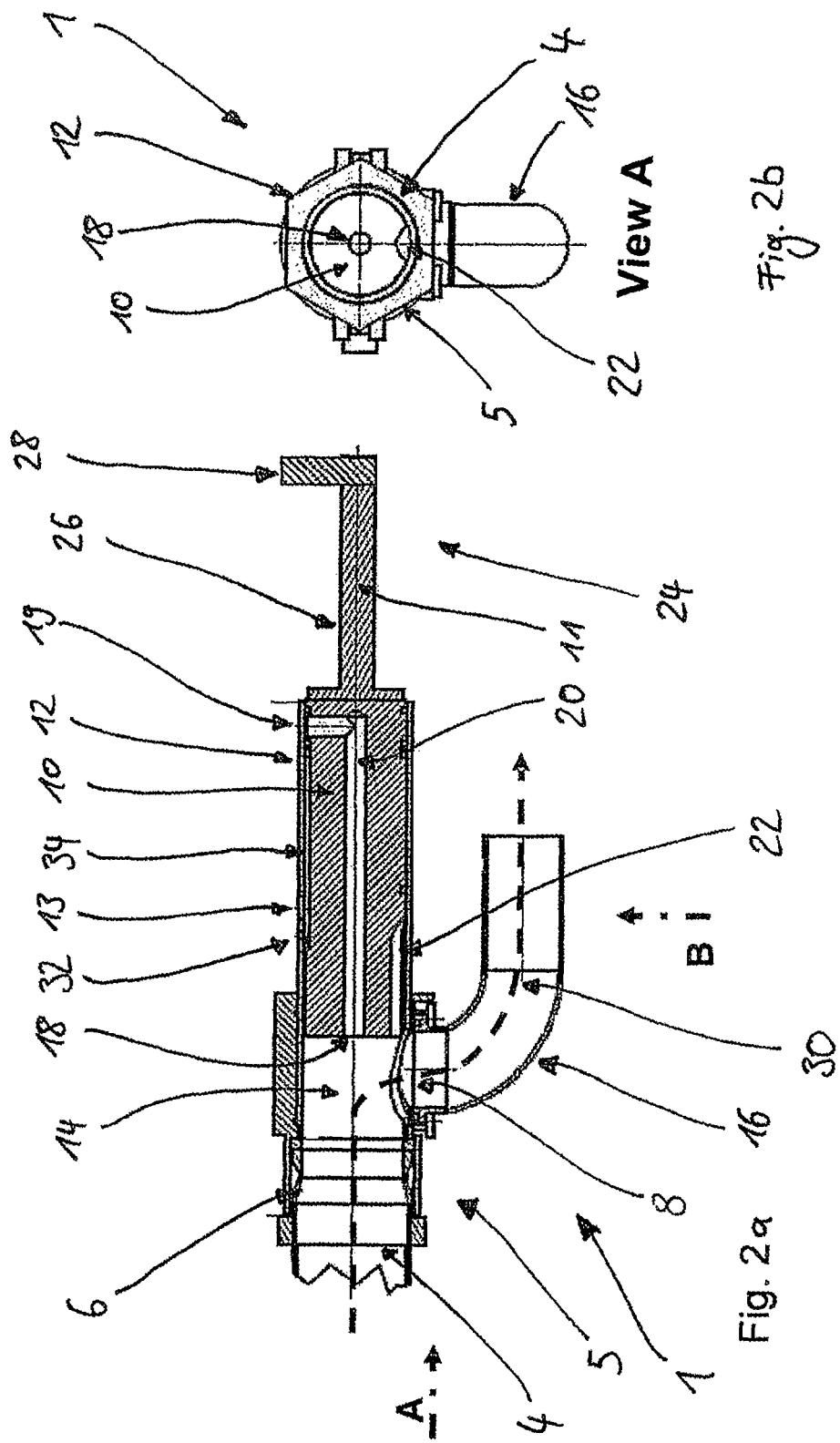

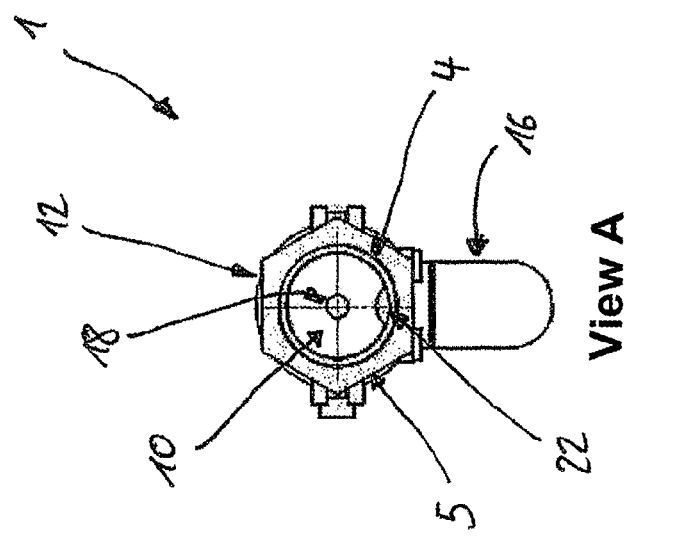
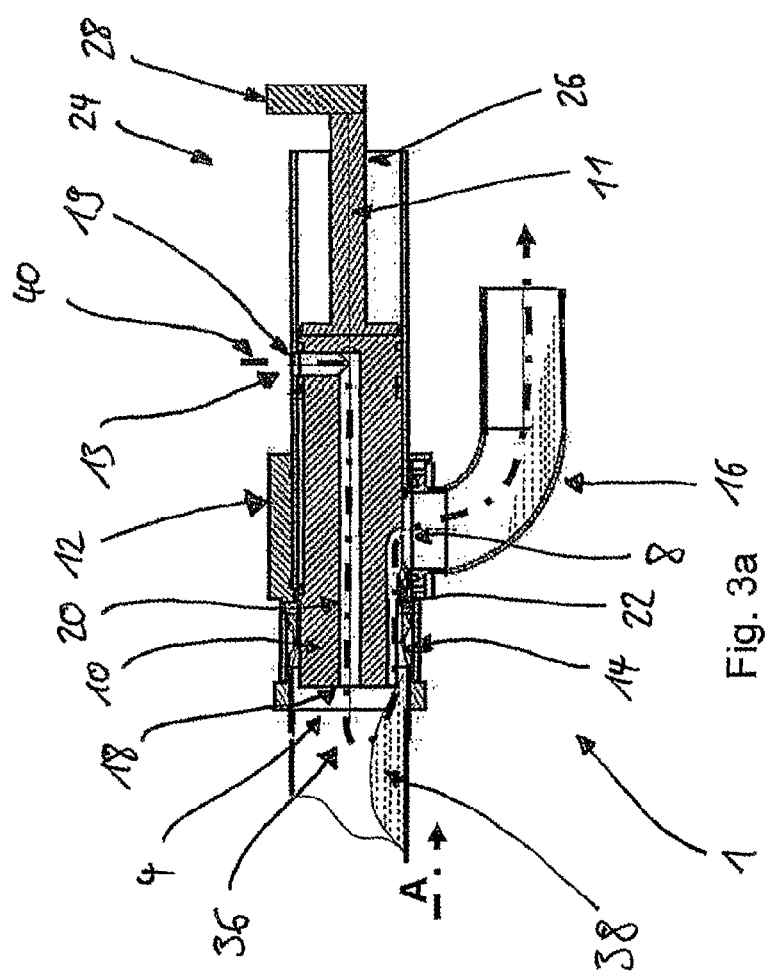

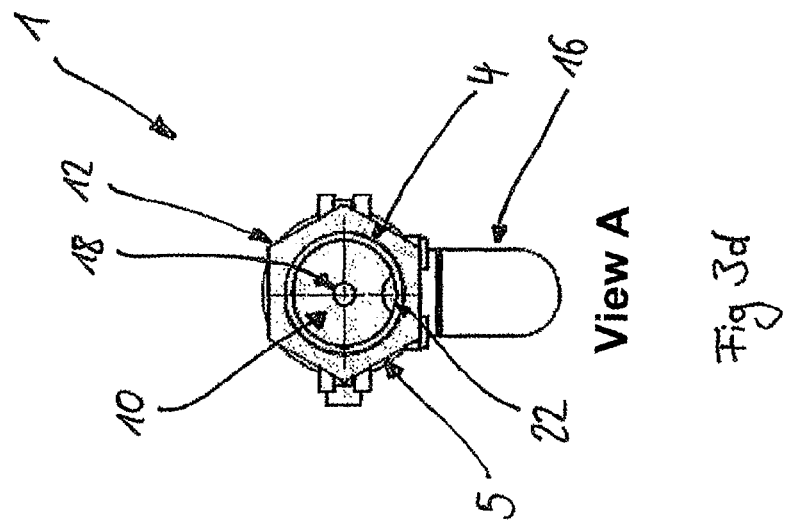
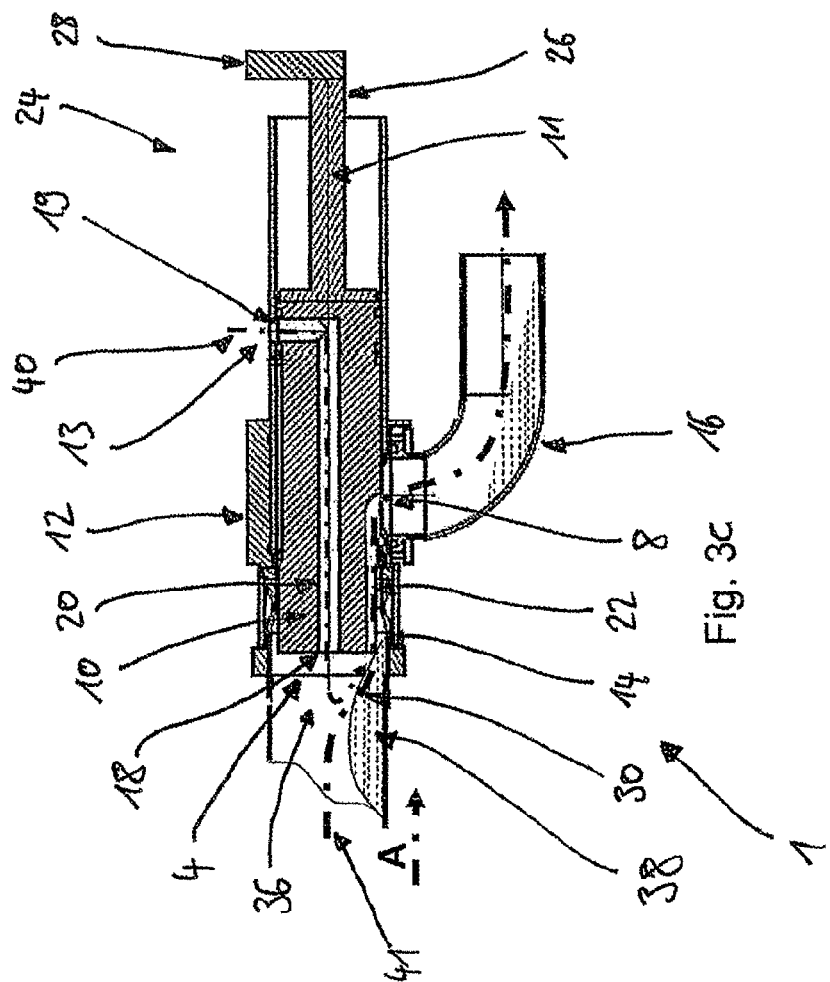
Fig. 3c
Fig 3d View A

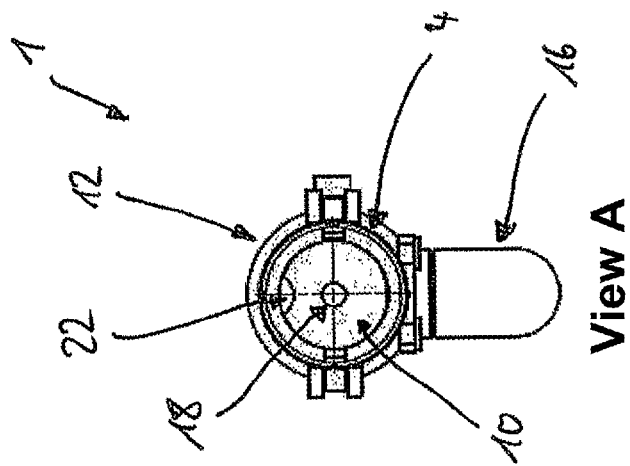
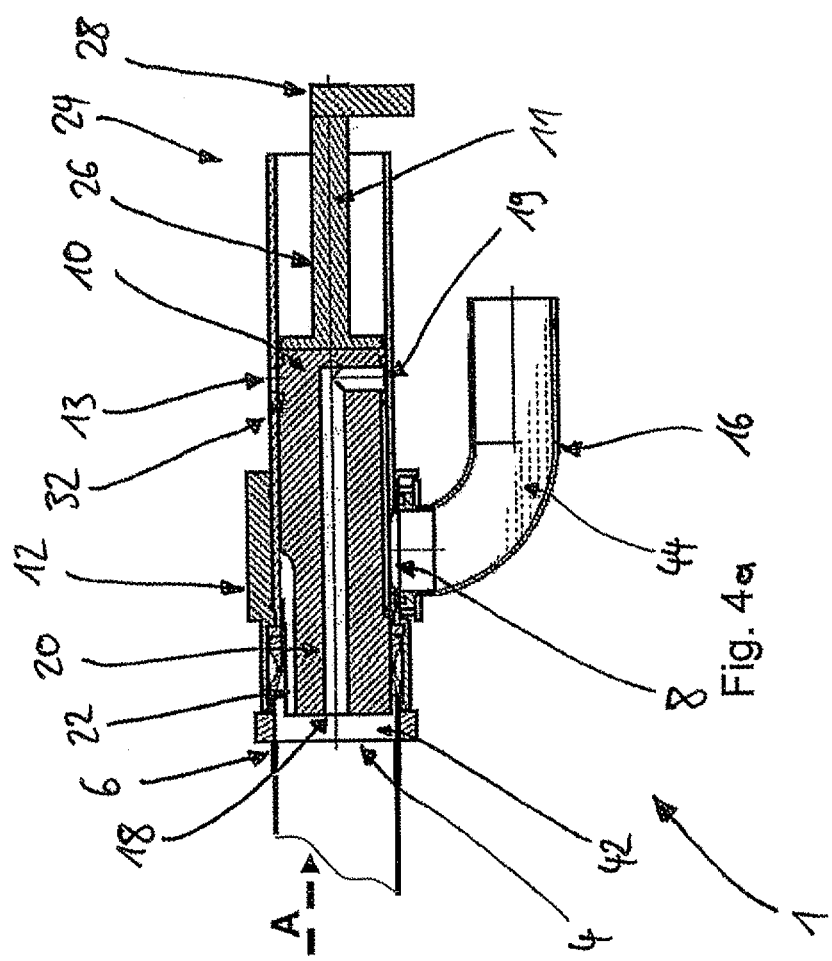
Fig. 4a
Fig. 4b  View A

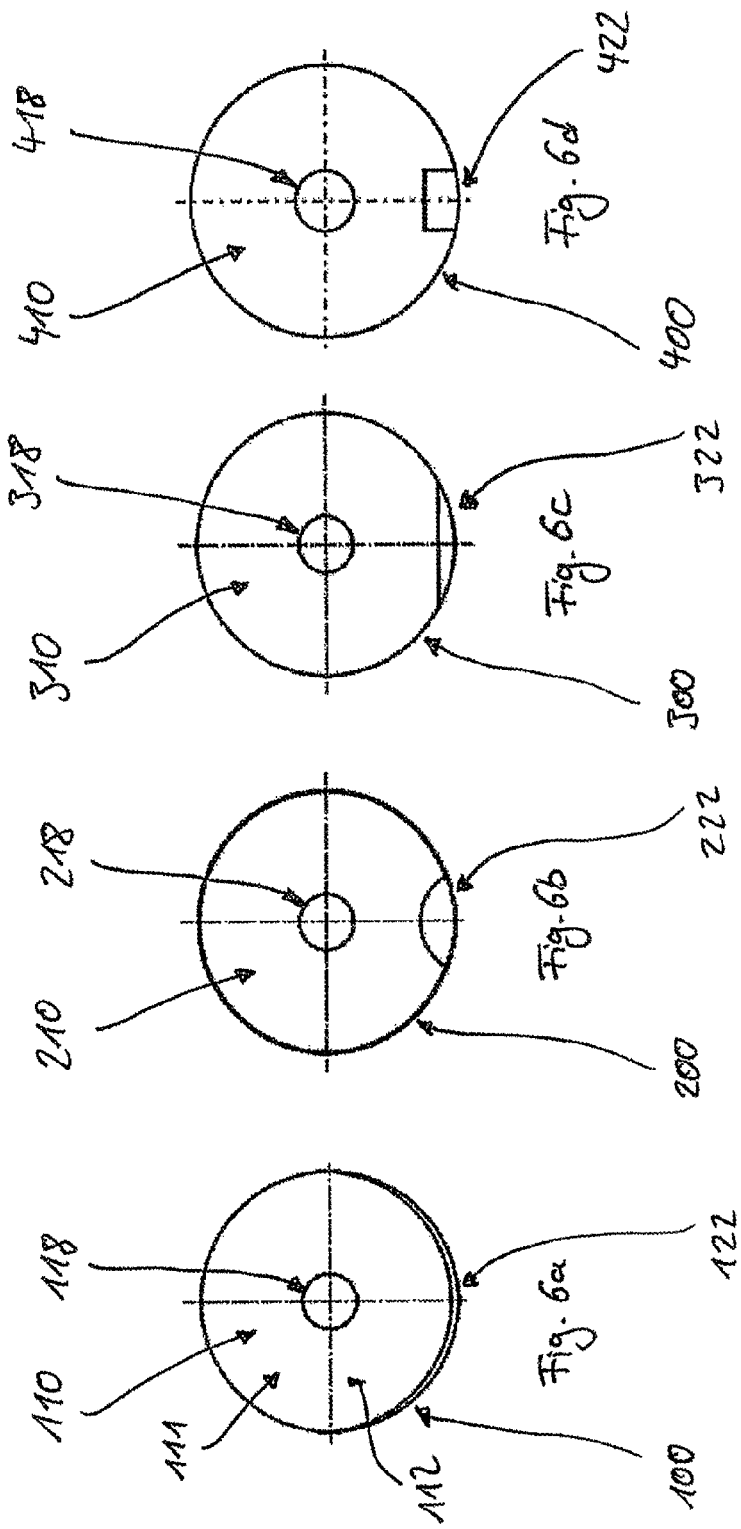

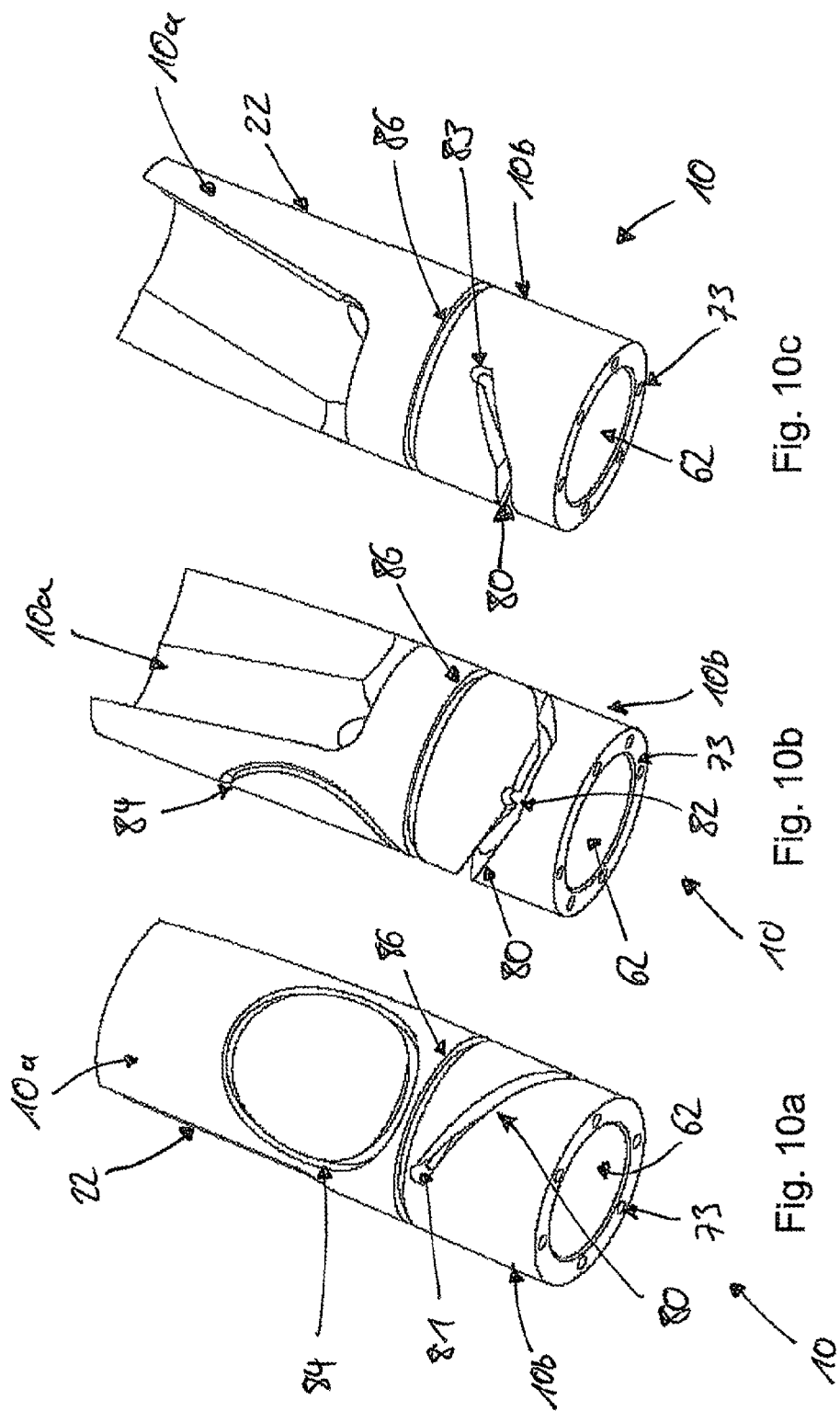

SUCTION COUPLING

CROSS REFERENCE TO RELATED APPLICATIONS

This application is the U.S. national phase of International Application No. PCT/EP2011/073930 filed on Dec. 23, 2011, which application claims priority to German Patent Application No. 202011002009.6 filed on Jan. 27, 2011, the contents of both of which are incorporated herein by reference.

The invention relates to a suction device for removing a mixed fluid, in particular fecal matter, from a collecting tank, in particular from a sewage tank of a railway vehicle, comprising a mixed fluid inlet for receiving the mixed fluid, said mixed fluid inlet being fluidically connectable to a connection port of said collecting tank, a mixed fluid outlet for discharging the mixed fluid, said mixed fluid outlet being fluidically connectable to a suction line, and a flow channel extending between said inlet and said outlet. The invention also relates to a suction station for removing a mixed fluid by suction and to a method for removing a mixed fluid by suction.

Many vehicles, particularly railway vehicles, but also other heavy goods vehicles and passenger vehicles such as caravans or yachts, have collecting tanks for collecting fecal matter. These collecting tanks must be emptied at regular intervals. For that purpose, many collecting tanks have a connecting piece, for example on the outside of a vehicle, to which a connecting hose of a suction tube can be connected so that the fecal matter in the tank can be sucked out by underpressure.

In many cases, conventional suction couplings or suction devices have a ball valve on the suction device end of the tube in order to close the tube after the suction operation in such a way that the removed fecal matter cannot escape from the tube. However, such a ball valve is arranged by design at a certain distance from the coupling surface between the connecting piece and the suction coupling, so it is possible for mixed fluid (fecal matter, for example) to collect in a dead space between the coupling surface and the ball valve and for such fluid to escape after the ball valve is closed and the coupling member is decoupled from the connecting piece. In the case of conventional suction couplings, up to about 0.5 liters of fluid escapes. Such escape of mixed fluid (fecal matter, for example) is not only undesirable on account of the bad odor, but also results in contamination of the suction stations and must also be considered alarming for health and water protection.

In order to solve this problem, DE 20 2004 019 308 U1 proposes that the suction tube be suspended at a greater height in a middle region between the coupling and the holding tank, and that the tube section between the coupling and the elevated point be provided with a smaller diameter, so that the flow velocity is higher in said section. However, it has been found with this solution that residues of mixed fluid or fecal matter remain behind in the coupling section and flow out after decoupling.

DE 10 2007 011 210 B3 proposes another solution. Although the proposed tube coupling has a closure element arranged directly at the plane of separation of the coupling, the residues of mixed fluid or fecal matter can still escape from the connecting piece after decoupling. In order to prevent this from happening, DE 10 2007 011 210 proposes that a membrane be arranged in the connecting piece, said membrane preventing the fecal matter from flowing out of the connecting piece after decoupling by forming a wall such that the fecal residues remain in the connecting piece. This prevents the fecal matter from directly escaping after decoupling, but the fecal residues can freeze in the connecting piece in winter, as a result of which renewed coupling is rendered impossible or substantially more difficult. It is also disadvantageous that such a membrane must be retrofitted to every connecting piece. Such retrofitting is costly and quite complicated.

Another solution for railway vehicles is proposed in DE 43 35 945 C2, in which, for each collecting tank in a railway vehicle, an additional shut-off valve is provided which must be opened by the user at his discretion at the start of the suction operation and closed when the suction operation has been completed. It is then a matter of operator skill whether the coupling can then be removed without dripping. For that reason, fecal matter often escapes in this embodiment also. It is also disadvantageous that the additional shut-off valve makes the suction coupling heavier, more complex and more costly.

The object of the present invention is therefore to provide an improved suction coupling in respect of at least one of the aforementioned disadvantages.

The present invention achieves its object, in a suction device of the kind initially specified, by means of a constriction member which is adapted to reduce a cross-section of the flow channel in sections thereof or along the entire length thereof. The invention exploits the fact that, when the filling level falls, air flows through the flow channel and can be manipulated to empty said channel of mixed fluid. The constriction member is preferably adapted to selectively constrict the flow channel. According to the invention, a higher flow velocity of the air is thus achieved in the constricted section, as a result of which mixed fluid or fecal residues in the region of the flow channel is/are removed by suction. At the transition from the connecting pipe, in which slow flow prevails, to the flow channel, in which faster flow prevails, the local acceleration of flow also results in turbulence, which ensures that even solid or highly viscous components of the mixed fluid are carried along and removed by suction. The effect of this flow is not confined to just the flow channel, but also, in sections at least, to a coupled connecting piece, with the result that the latter is also freed of mixed fluid or fecal matter. The constriction member is preferably adapted to selectively reduce a cross-section of the flow channel in sections thereof or along the entire length thereof. It is particularly preferred that the flow channel be arranged in a housing of the suction device. It is also preferable that a coupling element be arranged at the mixed fluid inlet, in order to couple the suction device to a connecting piece on a vehicle. Said couple is preferably in the form of a cam-and-groove coupling ("Kamlock" or "Camlock").

According to a first preferred embodiment, the constriction member forms a wall of the flow channel at least in sections thereof. In a first alternative, the flow channel is thus embodied, at least in sections thereof, as a recess, channel or bore in the constriction member. In another alternative, the flow channel is formed between a housing wall of the suction device and the constriction member. According to these alternatives, the constriction member can be embodied, for example, as a separate body which is insertable into a housing of the suction device. For example, a channel which is substantially equal to the diameter of a connecting piece which is connectable to the mixed fluid inlet is formed in a housing. This channel can extend from the mixed fluid inlet to the mixed fluid outlet. The constriction member is then insertable or inserted into said channel in such a way that it forms a wall of the flow channel at least in sections thereof.

According to another preferred embodiment, the constriction member is movable relative to the inlet and/or outlet into a first and a second position, the cross-section of the flow channel being less in the second position than in the first position. In this way, according to the invention, it is possible to vary the diameter of the flow channel, preferably during a suction operation. The suction operation can thus be started with a large flow channel cross-section at first, so that a high volumetric flow is achieved. Toward the end of the operation, the constriction member can be moved into a second position, as a result of which the cross-section of flow is constricted and the effects described above, namely acceleration of the fluid and removal by suction of any fluid residues, are achieved in stronger form. In one preferred embodiment, the cross-section in the second position is half as large as the cross-section in the first position. In another preferred embodiment, the ratio of the cross-section in a second position to the cross-section in the first position is one of the following: 0.4, 0.35, 0.3, 0.25, 0.2, 0.15, 0.1, 0.05. In another preferred embodiment, the cross-section decreases along the direction of flow of the flow channel in the second position. In one alternative, the constriction member is in the form of a shutter. Such a shutter is preferably designed in such a way that the size of the aperture can be varied. In another alternative, the suction device has a section designed like a pinch valve, in which the flow channel is embodied. An inner wall of the pinch valve thus forms the constriction member. By squeezing the pinch valve, the cross-section of the flow channel can be reduced.

According to another preferred embodiment, the constriction member can be moved into a third position in which the constriction member closes the flow channel. According to the invention, this obviates the need for an additional shut-off valve, as a result of which the structure of the suction device is substantially simplified. The weight of the suction device according to the invention is also reduced in this manner. Alternatively, it is possible by moving the constriction member into a third position to activate a closing element which is adapted to close the flow channel.

According to yet another preferred embodiment, the constriction member has a recess which is in fluidic communication with the inlet and the outlet when the constriction member is in the second position. Such a recess may take the form, for example, of a through hole or a through-channel in the constriction member. In this case, the flow channel is preferably defined in the first position by a housing. In the second position, the flow channel is preferably defined in sections or in its entirety by the constriction member, whereas in the third position it is completely sealed by means of the constriction member.

According to another preferred embodiment, the recess is formed on a circumferential surface of the constriction member. The recess is preferably in the form of a groove. Forming the recess on the circumferential surface, for example as a groove, is a particularly efficient way of forming this recess on the constriction member. Alternatively, the constriction member has a section on its circumferential surface which is adapted to match a housing wall in such a way that a constricted flow channel, in particular a slot, is formed. The recess is formed, for example, as a flattened portion on the constriction member. A recess should be understood here as being any shape of constriction member which exposes or releases a slot as a flow channel between the constriction member and a wall of a housing, for example.

According to another preferred embodiment, the constriction member is in the form of a piston. It is particularly preferred that the constriction member be embodied as a movable piston. This piston can preferably be moved along its piston axis in a hollow space within the housing of a suction device. A particularly preferred embodiment is one in which a recess or the recess is formed on the outer surface of the piston such that said recess forms a wall of the flow channel at least in sections thereof when the piston is in a second position.

According to another preferred embodiment, the constriction member is cylindrical in shape and includes a handling means with which it can be moved by being pushed along and/or turned about its cylindrical axis between the first, second and/or third positions. The constriction member can thus be moved from the first into the second position by sliding it, and can be moved from the second into the third position by turning it, for example. Alternatively, the piston can be moved from the first into the second position by sliding it, and from the second into the third position by sliding it. In another alternative, the piston can be moved from the first into the second position by turning it, and can be moved from the second into the third position by sliding it. In yet another alternative, the piston can be moved between all three positions by turning it. By forming the constriction member as a cylindrical piston, movement is possible with these two degrees of freedom (turning, sliding), as a result of which a suction device according to the invention can be easily handled. Alternative preferred handling means comprise, for example, grips, sliders, levers, pushrods, cable pulls, pinions and gear racks, or the like.

According to another preferred embodiment, the suction device has an air inlet which opens into the flow channel and which can be released or blocked for selectively feeding air into said flow channel. Feeding air into the flow channel further intensifies the formation of turbulence in the flow channel, as a result of which even more turbulence occurs, such that the flow channel and hence the suction device are freed more effectively of fecal residues. The air can be fed selectively, such that the air inlet preferably remains closed during a suction operation and can opened toward the end of the suction operation. The air inlet may be provided, for example, in the form of an opening in a housing, which can be blocked or released by means of a flap, a slider, a plug, or similar. In one alternative, the air inlet can be release by means of a pivotable flap in a housing in such a way that the flap can be pivoted toward or into the flow channel. In this way, releasing the air inlet is coupled with constriction of the flow channel. Alternatively, the suction device has means which provide automatic release of an air inlet if a particular event occurs. Such an event may be a specific filling level of a collecting tank, for example, or a specific pressure in the suction device. In another alternative, the air inlet can be released and blocked in such a way that a volumetric flow of air can be set. The size of an air inlet can preferably be dimensioned then in such a way that the suction device and/or an adjoining connecting piece is/are freed of fluid residues, yet no additional fluid and/or no additional fecal matter is sucked from an adjoining collecting tank.

According to another preferred embodiment, the air inlet is formed as a recess in the constriction member and is connected to an air passageway in the constriction member, which air passageway can be released or blocked. The air inlet can thus be moved accordingly, together with the constriction member, relative to the mixed fluid inlet and to the mixed fluid outlet. Due to the positioning of the air inlet, the air can be introduced in a more targeted manner into the flow channel, and residual fluid can be removed more efficiently from the suction device as a consequence. The air inlet is preferably disposed adjacent to the recess on the constriction member which defines the flow channel. This allows the air to be guided even better to the flow channel. In one alternative, the air channel can be released or blocked by means of the aforementioned handling means. Providing an air inlet which can be released and blocked is particularly advantageous, especially in situations in which the suction operation performed by the suction device is to be stopped before the collecting tank of the vehicle has been completely emptied, so that it is still primarily mixed fluid that is conveyed through the flow channel in such a case, not air or only insufficient amounts of air. This air inlet is also advantageous in cases where the collecting tank of the vehicle is completely emptied. Although residues of mixed fluid are still removed successfully using the air that is in the collecting tank, even when no air inlet is provided, providing the air inlet additionally in accordance with the invention constitutes a further improvement because additional air is provided for removing the residues of mixed fluid or fecal matter.

According to another preferred embodiment, the suction device has a housing which has a recess which is in fluidic communication with the air inlet when the constriction member is in the second position. The recess in the housing is preferably in fluidic communication with the air inlet only when the constriction member is in the second position. This means that the air inlet is closed when the constriction member is in the first position. When the constriction member is in the first position, the cross-sectional area of the flow channel is also at its maximum, preferably. A vacuum applied to the mixed fluid outlet can then be used efficiently to empty a collecting tank. If the constriction member is in the second position, the air inlet is released. Additional air can flow into the flow channel and, by causing turbulence and/or flow acceleration, can support the process by which residual fluid is carried along and therefore removed from the suction device. The recess is preferably formed as a through bore in the housing. In one alternative, the housing has a plurality of recesses, preferably as through bores with different cross-sections, such that the volume of air which can be fed through the air inlet to the flow channel is adjustable. By moving the constriction member, the air channel which is formed in the constriction member can be fluidically connected to a respective recess. In another alternative, the recess is in the form of an elongate hole of variable width, and the air channel is provided with a substantially circular cross-section in the constriction member. This allows the volume of air which can be fed through the air inlet to the flow channel to be controlled by moving the constriction member accordingly in relation to the elongate hole.

According to another preferred embodiment, the suction device has a closing body for selectively releasing or blocking the air inlet and which can be moved back and forth between an open position and a closed position. Such a closing body is preferably embodied as a slider. This is a particularly simple way of arranging the releasing or blocking of an air inlet. Such a slider can preferably be moved into various intermediate positions such that the volume of air which is fed through an air inlet to the flow channel can be adjusted.

In one preferred development of the invention, the closing body is stationarily fixed to a housing of the device. This reduces the number of moving parts. It is preferred that the constriction member can be moved relative to both the housing and the closing body. Being stationarily fixed relates to the external dimensions of the closing body. In this case, being stationarily fixed includes the closing body being movable, in particular rotatable, about an axis of symmetry.

The closing body is preferably disposed at least partially in a recess in the constriction member. It is preferred that the closing body be integrated at least partially in the constriction member. This protects the closing body better against external influences. Since the closing body is meant to have a sealing effect, it is advantageous for the operability of the device when the closing body is exposed as little as possible to external influences. The closing body is preferably disposed and/or integrated in its entirety in the constriction member.

It is also preferred that a longitudinal axis of the closing body be arranged substantially coaxially with a longitudinal axis of the constriction member. In this case, the closing body can be moved in a particularly preferred manner relative to the constriction member, and/or the constriction member can be moved relative to the closing body. It is also preferable in this case that the channel in the constriction member be arranged parallel inside the latter, in particular coaxially with the latter. In this case, the closing body is also coaxial with the channel and adapted to close the latter in a simple and effective manner, thus closing the air inlet as well.

A particularly preferred embodiment is one in which the closing body is connected via a holding member to the housing and in which the holding member, together with a recess on the constriction member, forms a slotted guide for said constriction member. The slotted guide is preferably configured in such a way that the constriction member can effectively be moved relative to the housing and the closing body. Alternatively, a slotted guide for the constriction member is also preferred without a closing body and without a holding member, in combination with any one of the embodiments described above. By connecting the closing body to the housing by means of a holding member, such as one or more screws, pins, ribs, rivets, etc., said closing body is stationarily disposed in relation to the housing. The holding members preferably passes through a slot-shaped recess in the constriction member, in such a way that the recess co-operates with the holding member to act as a slotted guide. By this means, the constriction member is always movable in a predetermined manner relative to the housing, as well as to the fluid inlet, the fluid outlet and to the closing body. This means that the closing body adopts a predetermined, defined position relative to the position of the constriction member at all times. The handling of the device is substantially simplified as a consequence.

It is also preferred that the constriction member and/or the closing body include(s) sealing means for sealing the suction device fluid-tightly and preferably pressure-tightly against the surroundings. Such sealing means may include or have O-rings, X-rings or the like, for example. It is also preferred that the mixed fluid inlet be connectable to a connection port of a collecting tank by means of a coupling, preferably by means of a quick-fit coupling, the suction device having a first coupling portion which can be brought fluid-tightly and preferably pressure-tightly into engagement with a second coupling portion of the connection port of the collecting tank. Such a coupling is preferably embodied as a cam-and-groove coupling, and the first coupling portion is embodied as a female portion.

According to another aspect of the invention, the object is achieved in a suction station of the kind initially specified, for removing a mixed fluid, in particular fecal matter, from a collecting tank, in particular from a sewage tank of a vehicle, said suction station comprising a holding tank for the mixed fluid, a suction line for feeding the mixed fluid to the holding tank, a conveyor unit adapted to generate underpressure in the suction line and to convey the mixed fluid through the suction line into the holding tank, and a suction device connected to the suction line, for removing the mixed fluid from the collecting tank, by the suction device being embodied according to any one of the preferred embodiments above. Such suction stations are disposed, for example, at service railway stations for railway vehicles, or in yacht harbors and shipyards. For example, the vehicle with a collecting tank, in particular a sewage tank, can be driven to such a suction station, and the collecting tank can be emptied by means of the suction device in the suction station. The conveyor unit is preferably embodied as a vacuum pump (or rotary lobe pump). A rotary lobe pump is preferably provided as the vacuum pump. Alternatively, other conventional pump devices designed to produce underpressure may be used. With regard to the advantages achieved by the suction station according to the invention, reference is made to the above observations concerning the suction device according to the invention.

When applying a method of the kind initially specified for removing a mixed fluid, in particular fecal matter, from a collecting tank, in particular from a sewage tank of a railway vehicles, by means of a suction device which is preferably embodied according to any one of the preferred embodiments of a suction device, the object of the invention is achieved, according to a further aspect of the invention, by the steps of: coupling the suction device to a connection port of the collecting tank; sucking the mixed fluid out of the collecting tank by means of underpressure; reducing a cross-section of the flow channel, in particular in sections thereof or along its entire length, by means of a constriction member of the suction device; and decoupling the suction device. Reducing a cross-section of the flow channel causes local acceleration of the air flowing through the flow channel, as a result of which mixed fluid residues in the flow channel are carried along and removed (slurped). Local acceleration of flow speed also causes swirling, as a result of which even adhering fluid residues can be removed. The step of reducing the cross-section is also referred to as "slurping". It is preferred, in particular, that the step of reducing the cross-section or slurping be initiated when the collecting tank has been emptied, so that air which can flow through the ventilation valve of the collection tank is sucked out. The expression "emptied" should be understood, within the meaning of the invention, as the state in which the filling level insider the collecting tank has dropped so far that it is mainly only air, and preferably air only, that is being sucked out of the collecting tank. In this way, according to the invention, a suction device which is used to remove the mixed fluid is freed of fluid residues in the region of the coupling, in particular. The step of reducing the cross-section or "slurping" preferably takes less time than the step of sucking out the mixed fluid. The reduced cross-section state should preferably be held for about 2 to 30 seconds, after which the suction device is to be decoupled. During said 2 to 30 seconds, it is necessary to remove as much residual fluid from the suction device that the latter can be decoupled substantially without any dripping occurring after decoupling. In this way, the escape of fecal matter is prevented or at least substantially reduced, according to the invention.

According to a first variant of the method, the latter comprises the step of closing the flow channel by means of the constriction member prior to the step of decoupling the suction device. In this way, a suction device is secured even more effectively against any escape of fluid residues. Shaking the suction device after decoupling does not cause any mixed fluid to escape, either. More specifically, this closure of the flow channel is preferably achieved by means of the constriction member. According to the invention, this makes it substantially easier to carry out the method. The constriction member can preferably be moved into three different positions. The constriction member must be moved into and held in a first position for the suction operation, whereas the constriction member must be moved into a second position when the cross-section is reduced, and into a third position to close the flow channel.

According to another preferred variant of the method, the step of moving the constriction member involves turning and/or sliding the constriction member. Turning and sliding are simple motions that the user of the method can carry out in a reliable manner. Alternatively, the step of moving may involve pivoting the constriction member.

According to another preferred variant of the method, reducing the cross-section involves sliding the constriction member, and closing the flow channel involves turning the constriction member. Carrying out the method is further simplified in this manner. For example, in order to reduce the cross-section, the constriction member must be moved from the first position into the second position against a stop member. To close the flow channel, the constriction member must then be turned about a rotational axis, which again involves turning it as far as a stop member. This makes the method easy for a user to carry out and unsusceptible to errors. In particular, it is possible to carry out the method using only one hand if the constriction member includes handling means.

According to yet another preferred variant, the method comprises the step of selectively feeding air into the flow channel by releasing and blocking an air inlet. Feeding air into the flow channel causes stronger turbulence and further acceleration in flow, with the result that residual fluid, also adhering residual fluid, can be removed from the flow channel. The air inlet must preferably be released simultaneously with or during the step of reducing a cross-section of the flow channel.

The invention shall now be described on the basis of an embodiment and with reference to the attached drawings, in which:

FIG. 2a shows a cross-sectional view of a suction device having a constriction member in a first position;

FIG. 2b shows a frontal view of a suction device having a constriction member in the first position;

FIG. 3a shows a cross-sectional view of a suction device having a constriction member in a second position;

FIG. 3b shows a frontal view of a suction device having a constriction member in the second position;

FIG. 3c shows another cross-sectional view of a suction device having a constriction member in the second position;

FIG. 3d shows another frontal view of a suction device having a constriction member in the second position;

FIG. 4a shows a cross-sectional view of a suction device having a constriction member in a third position;

FIG. 4b shows a frontal view of a suction device having a constriction member in the third position;

FIG. 6a shows a frontal view of a first alternative of a constriction member;

FIG. 6b shows a frontal view of a second alternative of a constriction member;

FIG. 6c shows a frontal view of a third alternative of a constriction member;

FIG. 6d shows a frontal view of a fourth alternative of a constriction member;

FIG. 10a shows a perspective view of a constriction member according to the embodiment shown in FIGS. 7 to 9;

FIG. 10b shows another perspective view of the constriction member in FIG. 10a; and FIG. 10c shows another perspective view of the constriction member in FIGS. 10a and 10b.

Figure 1:
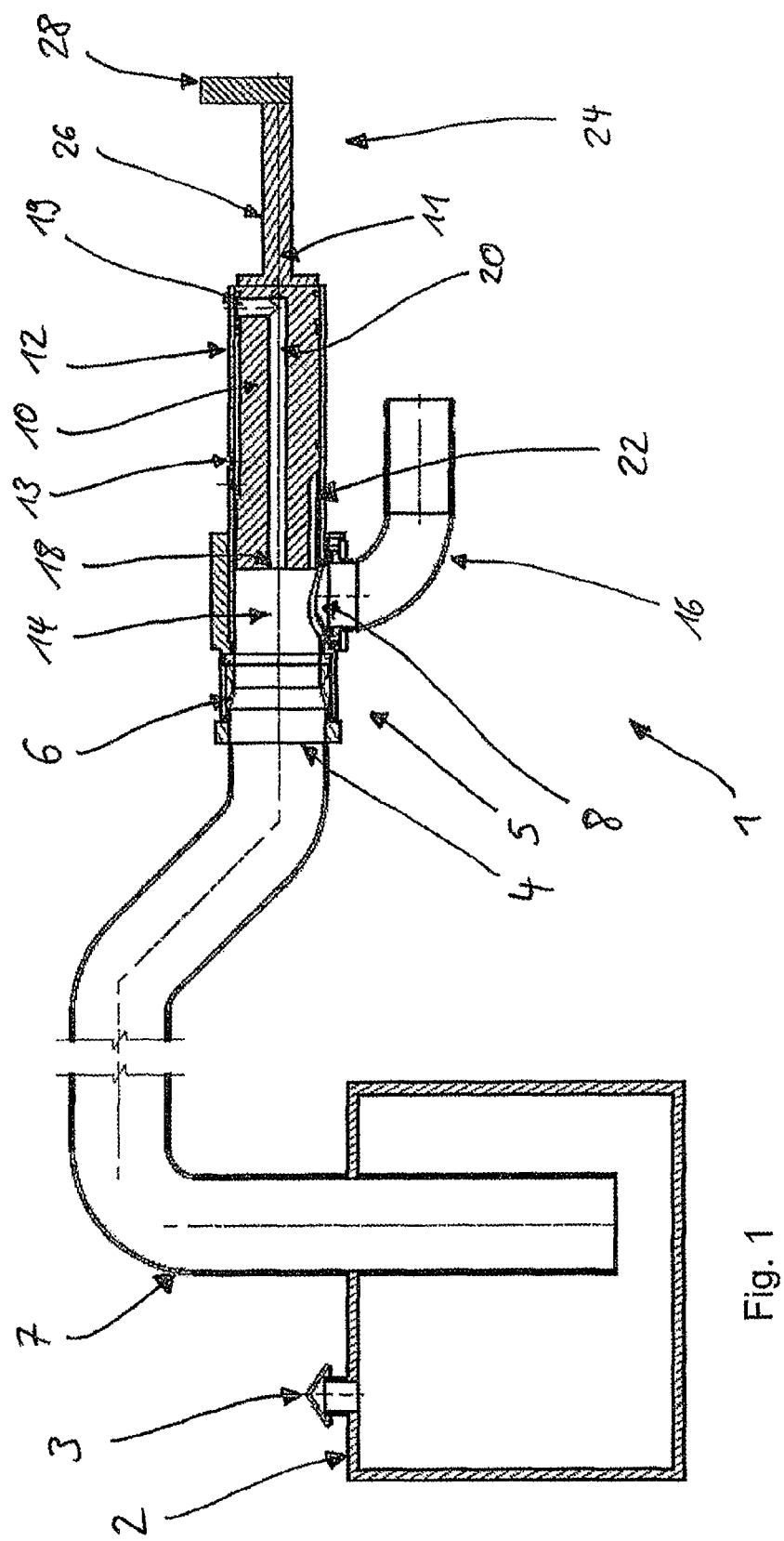
FIG. 1 shows a cross-sectional view of a suction device according to the invention, which is connected to a collecting tank via a pipe connector.

According to FIG. 1, a suction device 1 has a mixed fluid inlet 4 and a mixed fluid outlet 8 for removing a mixed fluid, in particular fecal matter, from a collecting tank 2. The mixed fluid inlet 4 is connected to a pipe connector 6 by means of a coupling 5. The pipe connector 6 is connected to the collecting tank 2 via a suction line 7. Collecting tank 2 also has a ventilation valve 3. Coupling 5 is preferably embodied as a positive-engagement cam-and-groove coupling, the male part of coupling 5 being form on pipe connector 6 and the female part of coupling 5 being formed on mixed fluid inlet 4. Between mixed fluid inlet 4 and mixed fluid outlet 8, there extends a flow channel 14 which is defined by a housing 12 of suction device 1 and by a constriction member 10 which is movably disposed inside housing 12. Mixed fluid outlet 8 is connected to a suction pipe 16 which can be connected to a tube (not shown) that preferably leads to a holding tank and is connected to a vacuum pump (neither of which is shown). According to this embodiment, constriction member 10 is embodied as a piston and is arranged translationally movably in housing 12 and coaxially with its piston axis 11. More particularly, constriction member 10 is arranged coaxially with a central axis of mixed fluid inlet 4. Mixed fluid outlet 8 is arranged substantially radially in relation to constriction member 10.

An air inlet 18 for feeding air into flow channel 14 is disposed on one side of constriction member 10 facing mixed fluid inlet 4. Said air inlet 18 is connected via an air channel 20 to a channel inlet 19 which is formed in constriction member 10. On a side facing away from mixed fluid inlet 4, the constriction member also has handling means 24 for moving constriction member 10 relative to mixed fluid inlet 4 and mixed fluid outlet 8, and relative to housing 12. According to this embodiment, handling means 24 comprises a pushrod 26 which is connected to a handle member 28. On an outer lateral surface, constriction member 10 also has a recess 22 in the form of a slurp groove 22.

FIGS. 2a-4b show different operating modes of suction device 1 during a suction operation. The expressions "mixed fluid" and "fecal matter" are used synonymously.

According to FIG. 2a, piston 10 is in the first position. In this first position, flow channel 14 has its maximum cross-section and therefore allows its maximum throughput, so a stream of fecal matter 30 can flow from collecting tank or sewage tank 2 to a holding tank. In this first position, inlet 19 of air channel 20 is closed by housing 12, so air inlet 18 is blocked. In the first position according to this embodiment, no air is introduced into the flow channel. Piston 10 is rotationally disposed in relation to housing 12 in such a way that slurp groove 22 is arranged adjacent to fluid outlet 8. This first position of piston 10 is also referred to as the "suction position".

View A in FIG. 2b shows suction device 1 from the direction of arrow A in FIG. 2a. Coupling 5 between mixed fluid inlet 4 and pipe connector 6 is in a coupled state. Air inlet 18 is formed around the middle axis 11 of piston 10 and is disposed on the end face of piston 10. According to this embodiment, slurp groove 22 is substantially in the form of a recess with a quadrant-shaped cross-section on an outer cylindrical surface of piston 10.

It is formed by divergence between said outer cylindrical surface and the corresponding inner surface of housing 12. Slurp groove 22 is disposed adjacent to mixed fluid outlet 8 (shown in FIG. 2a) and adjacent to suction pipe 16. A slurp groove is alternatively formed on housing 12.

In FIGS. 3a, 3b, 3c and 3d, piston 10 is arranged in a second position in relation to mixed fluid inlet 4, mixed fluid outlet 8 and housing 12. This second position is also referred to as the "slurp position" of piston 10. In this second position, flow channel 14 is greatly constricted, in that piston 10 is translationally moved in the direction of mixed fluid inlet 4. In this mode, slurp groove 22 forms a wall for flow channel 14. In this second position, flow channel 14 is substantially defined by the divergence between the outer cylindrical surface of the piston and the inner surface of the housing. The strong constriction of flow channel 14 causes acceleration of flow, as a result of which any residual fluid 38 in suction device 1, or in pipe connector 6 close to suction device 1, and/or close to coupling 5 is carried along an removed (slurped). In order to support this (slurping) operation, it is advantageous to feed additional air into flow channel 14. When piston 10 is in this second position, channel inlet 19 and opening 13 in housing 12 are congruent with each other, so air inlet 18 is in air communication with housing opening 13 and a flow of air 40 enters flow channel 14. This flow of air (slurp air) causes stronger turbulence in turbulence zone 36, as a result of which residual fluid 38 is removed more efficiently from suction device 1 and from the transitional region between the end face of piston 10, mixed fluid inlet 4, coupling 5 and pipe connector 6.

The frontal view onto mixed fluid inlet 4 in view A (FIG. 3b) is substantially the same as frontal view A (FIG. 2b) in the first position.

FIGS. 3a and 3b show the operation of suction device 1 with a slurp position, in which the collecting tank 2 to be emptied has not been completely emptied. In this case, only fecal matter flows from the direction of pipe connector 6 toward flow channel 14, whereas the entire slurp air is fed through air channel 20. In contrast, FIGS. 3c and 3d show suction device 1 with piston 10 in the "slurp position", but in FIGS. 3c and 3d the collecting tank 2 to be emptied has indeed been emptied. This means that both fluid residues 38 as well as additional slurp air 41 flow from the direction of pipe connector 6 through suction line 7. The slurp air 41 passes through ventilation valve 3 into collecting tank 2. The thicknesses of the broken lines indicating slurp air flows 40, 41 also indicate the ratio of volumetric flow rates between these tow slurp air flows 40, 41. If collecting tank 2 has been emptied, the substantially greater portion of slurp air passes through suction line 7 and pipe connector 6 to flow channel 14. However, it is preferred that a slurp air flow 40 can also be guided in this manner, since this leads to greater turbulence in turbulence zone 36, as a result of which fluid residues 38 are efficiently slurped and removed via flow channel 14. Due to air channel 20 being formed in piston 10 and air inlet 18 being formed on the end face of piston 10, air inlet 18 is located close to fluid inlet 4 when the piston is in the closed position, and the slurp air 40 flows substantially in the opposite direction to the natural direction of flow in flow channel 14, thus causing greater turbulence in turbulence zone 36. Due to this turbulence, it is also possible for solid components of the mixed fluid adhering to an inner wall of the housing or to an inner wall of pipe connector 6 to be loosed and slurped.

View A (FIG. 3d) shows a frontal view from the direction of pipe connector 6, and is identical to view A in FIG. 3b.

In FIGS. 4a, 4b, the piston 10 in suction device 1 is disposed in a third position which is also referred to as a "closed position". In this position, piston 10 is turned approximately 180° about its piston axis 11. This means that slurp groove 22 is rotated away from mixed fluid outlet 8, and piston 10 closes mixed fluid outlet 8 with its outer surface. Another consequence is that channel inlet 19 is not in air communication with opening 13 in housing 12, so no air or slurp air can flow through channel 20 into device 1 or into a flow channel. In this third position, neither mixed fluid nor slurp air flows from the direction of pipe connector 6. Due to mixed fluid outlet 8 being closed by the outer surface of piston 10, it is also not possible for fluid residues 44 deposited in suction pipe 16 to escape from the latter. The translational position of piston 10 in relation to housing 12 is substantially identical in the second and the third position, so an end face of piston 10 is disposed adjacent to mixed fluid inlet 4. A dead space 42 in suction device 1 is thus minimized, and no mixed fluid residues or fecal residues escape after pipe connector 6 is decoupled from suction device 1. Additional advantages are achieved by constriction member 10 being embodied as piston 10. For example, by moving piston 10 from the first position into the second position, any mixed fluid that is located on a wall is scraped off toward mixed fluid inlet 4, where it can then be slurped.

Frontal view A (FIG. 4b) shows a frontal view onto fluid inlet 4, piston 10 being in the "closed position" and coupling 5 being disengaged. In this position, suction pipe 16 and the pipe downstream therefrom, which leads to a holding tank (not shown), are closed, and neither fluid residues nor any odorous vapors or similar can escape from the suction station.

The manner of operation of a suction device 1 according to this embodiment shall now be described with reference to FIG. 2a-4b.

In a resting state, suction device 1 is decoupled from a pipe connector 6. If a suction operation is to be carried out, it is firstly necessary, therefore, to couple suction device 1 to a pipe connector 6. This is preferably done by means of coupling 5, said coupling 5 preferably being in the form of a cam-and-groove coupling. Furthermore, piston 10 is disposed in the third position prior to commencement of the suction operation. When piston 10 is in said position, mixed fluid outlet 8 is closed, and it is not possible for any mixed fluid to be spilled out of suction pipe 16 by handling the suction device, e.g. by lifting, swinging or shaking it. On its outer surface, piston 10 has a guide groove 34 which is adapted to co-operate with a guide pin 32, which is merely intimated in the Figures and which is disposed on housing 12, in order to allow the piston to be guided along a particular path. In the present Figures, guide groove 34 is disposed opposite the slurp groove, i.e. offset therefrom by 180°. The groove is alternatively arranged at a different angle relative to the slurp groove, for example at an angle ranging between 90° and 175°. Guide groove 34 is preferably formed in such a way that piston 10 can only be moved rotationally from the second into the third position, or vice versa, and can only be moved translationally from the second position into the first position, and vice versa. In order to carry out a suction operation by means of suction device 1, it is therefore necessary that piston 10, which is preferably in the third position initially, be brought into the first position. This can be done easily by an operator using handling means 24. In order to bring piston 10 from the third position into the first position, it is firstly necessary to turn piston 10 about its piston axis 11 and then to pull on handle member 28 in order to move piston 10 translationally into the first position. If underpressure is now applied to suction pipe 16, the suction operation begins and a stream of mixed fluid 30 flows through flow channel 14. According to an alternative embodiment not shown here, the constriction member in the form of piston 10 can be moved by a slight amount in the first position and/or in the second position and/or in the third position, for example by a few degrees rotationally into a detent position. The detent function is provided, for example, by an additional groove and a guide pin or by designing guide groove 34 accordingly. This detent position is preferably reached with the support of a spring, so that uncontrolled disengagement from the detent position is rendered more difficult. It is further preferred, according to an alternative embodiment, that locking means be provided in order to lock the constriction member, embodied as piston 10, in the detent position.

Toward the end of the operation, or in the event of the operation having to be interrupted, piston 10 must be brought into the second position, that is to say the "slurp position", which is used to clean suction device 1 of any fluid residues. In said position, flow channel 14 is constricted and slurp air can flow in, either through ventilation valve 30 of collecting tank 2 or through air channel 20. Due to the slurp air having a substantially lower viscosity than the mixed fluid or the fecal matter, bringing piston 10 into the slurp position causes the stream of fecal matter 30 to be substantially interrupted and the slurp air 40, 41 produces turbulence 36, as a result of which fluid residues 38 can be slurped. In operation, it is necessary to wait in this position until all residues have been slurped, a process that generally takes about 10 to 30 seconds. When the collecting tank has been emptied, piston 10 can also be moved back and forth during slurping by means of handle member 28 and pushrod 26, in order to produce stronger turbulence and to scrape any fluid residues from housing 12 with the end face of the piston. For this purpose, piston 10 preferably has sealing elements disposed in an outer surface of the piston. Once the respective length of time has been waited and all fluid residues have been slurped from suction device 1, piston 10 must be brought into the "closed position" by turning it, as a result of which mixed fluid outlet 8 and channel inlet 19 are closed. Suction device 1 must then be decoupled from pipe connector 6.

According to the plan view onto a suction device 1 from the direction of mixed fluid outlet 8 (FIG. 5a), suction pipe 16 with its central axis 17 is arranged parallel to the longitudinal axis 11 of piston 10 (not shown in FIG. 5a) and device 1, in a first embodiment of suction device 1. Suction pipe 16 is bent substantially in the shape of a quadrant, preferably in a range between 75° and 105° (FIGS. 1-4), and has a cylindrical cross-section. Suction pipe 16 is connected by a first end to mixed fluid outlet 8, preferably fluid-tightly, and by a second end to a tube. Suction pipe 16 is fixed to the housing 12 of suction device 1 by means of fixing means 50a, 50b, 50c, 50d. It is preferable that suction pipe 16 is reversibly and detachably fixed by said fixing means 50a, 50b, 50c, 50d. Fixing means 50a, 50b, 50c, 50d are also adapted so that suction pipe 16 can be arranged in a plurality of different positions in relation to mixed fluid outlet 8. In alternative embodiments, this plurality of positions is either infinitely variable or in the form of predefined detents. A particularly preferred embodiment is one in which suction pipe 16 is designed to be rotationally pivoted with infinite variation by approximately 90° in either direction. According to FIG. 5b, suction pipe 16 is arranged in a position in which the central axis 17 of suction pipe 16 is substantially perpendicular to the piston axis 11 and the longitudinal axis of suction device 1. This allows an operator to arrange the suction pipe 16 at all times in such a way that suction device 1 can be used in an ergonomically favorable manner and that any kinking or sharp bending of the tube leading to the holding tank is prevented.

Figure 5A:
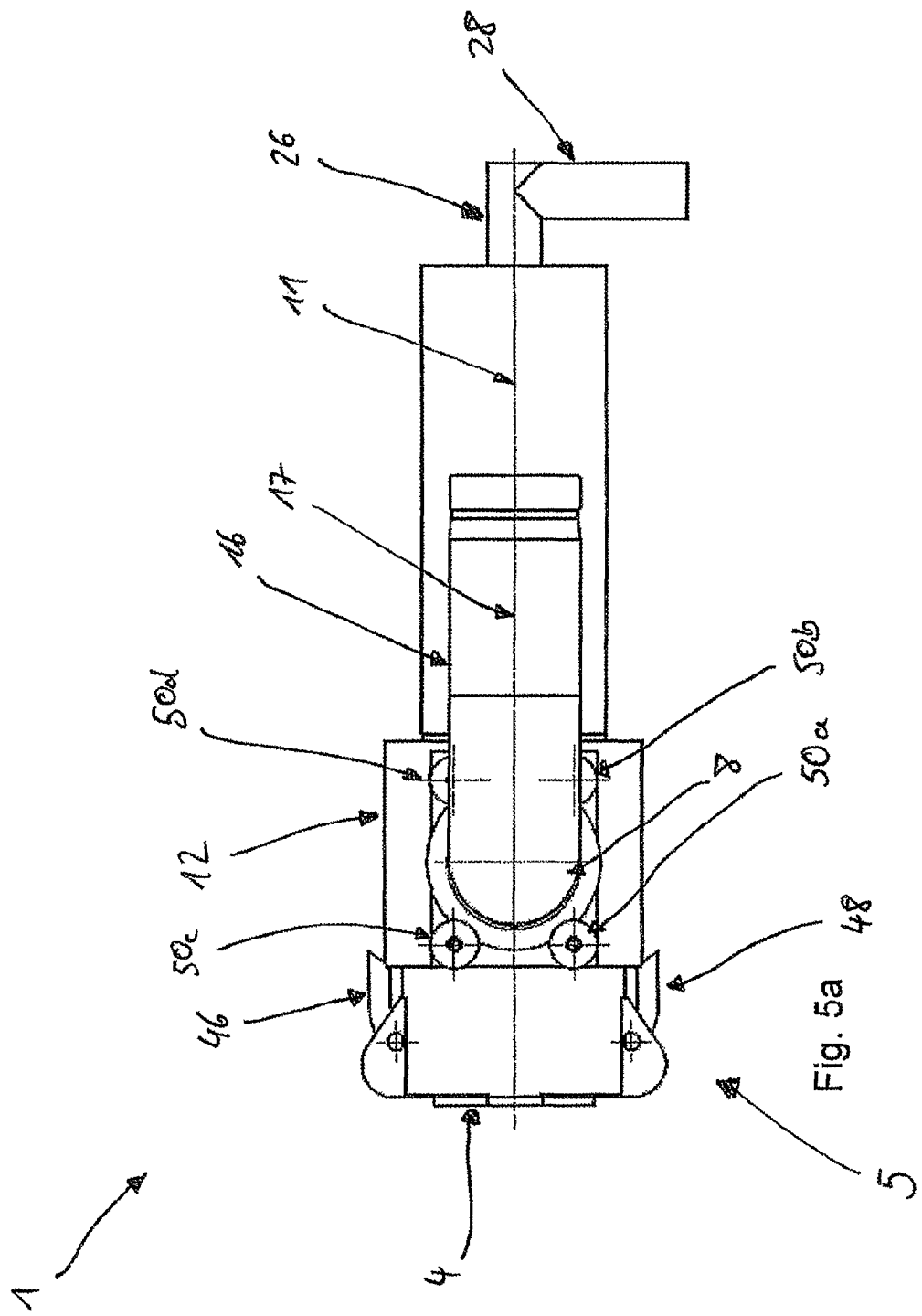
FIG. 5a shows a plan view of a suction device having a suction pipe connector according to a first embodiment.
Figure 5B:
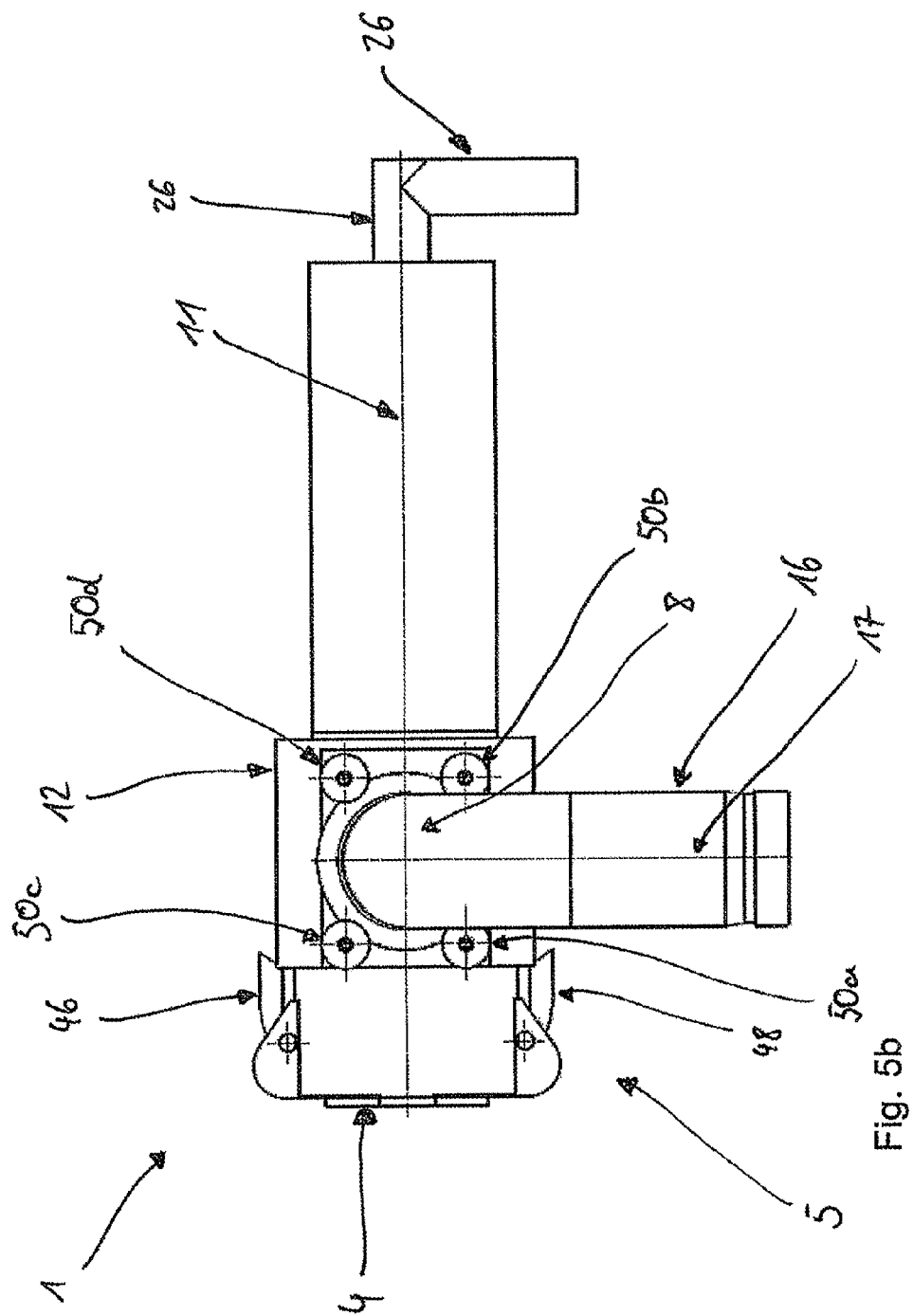
FIG. 5b shows another plan view of a suction device having a suction pipe like that of FIG. 5a but in which the suction pipe has been rotated approximately ninety degrees.

According to FIGS. 5a and 5b, suction device 1 has a coupling 5 adjacent to a mixed fluid inlet 4, said coupling being embodied, according to this embodiment, as a cam-and-groove coupling for connecting a female part to a male part. The female part of coupling 5 has two lever arms 46, 48 which are used to connect coupling 5 by positive engagement to the male part of the coupling on pipe connector 6.

FIGS. 6a, 6b, 6c, 6d show four alternative embodiments of a cylindrical piston 110, 210, 310, 410 having a slurp groove 122, 222, 322, 422. In a first embodiment, the slurp groove 122 on piston 110 is embodied as a slot. In this case, piston 110 is embodied only partially in cylindrical form. It has a first half 111 of semi-circular cross-section and a second half 112 of elliptical cross-section. The inner contour of housing 100 is cylindrical in shape. A slot 122 is formed in this manner between piston 110 and an inner wall of housing 100, said slot forming slurp groove 122.

According to a second embodiment (FIG. 6b), piston 210 is substantially cylindrical in shape, and the inner contour of housing 200 is likewise cylindrical. According to this embodiment, slurp groove 222 is in the form of a semi-circular or semi-cylindrical groove 222.

According to a third embodiment (FIG. 6c), piston 310 is substantially cylindrical in shape and has on one side a planar flattened portion which is parallel to its central axis. The inner contour of housing 300 is cylindrical in shape. Slurp groove 322 is thus formed by the divergence between the two shapes.

According to a fourth embodiment (FIG. 6d), piston 410 is substantially cylindrical in shape and has a rectangular groove 422. In all four embodiments, air inlet 118, 218, 318, 418 is coaxial with the central axis. In an alternative embodiment, air inlet 18 is arranged offset in the direction of slurp groove 122, 222, 322, 422. In another alternative embodiment, air inlet 18 is spaced apart from slurp groove 122, 222, 322, 422. In yet another alternative embodiment, a plurality of air inlets are formed on piston 10.

FIGS. 7-10c show suction device 1 and piston 10 in a further embodiment. Structurally or functionally identical and/or similar parts are marked with the same or similar reference signs wherever this was considered appropriate. Reference is made to the entire observations made in respect of the Figures and embodiments in the foregoing.

Suction device 1 (FIGS. 7-9) has a mixed fluid inlet 4 and a mixed fluid outlet 8. A coupling 5 is disposed close to mixed fluid inlet 4. Coupling 5 is fixed to the housing 12 of suction device 1. The substantially cylindrical piston 10 forming the constriction body is movably disposed inside housing 12. According to this embodiment, piston 10 has a front section 10a which slantingly tapers like a shovel or beak. The slanting edge forms a guide for the mixed fluid when the latter is being removed by suction from collecting tank 2. In a rear section 10b of piston 10, there is a recess 62 which according to this embodiment is substantially cylindrical in shape. A closing body 60 is disposed in recess 62. Closing body 60 has a plug-like protrusion 64 which points toward mixed fluid inlet 4 and which has such a diameter that, in a closed position, it closes air inlet 18 which is formed in piston 10. Closing body 60 is arranged substantially coaxial with the longitudinal axis 11 of piston 10. By means of a screw 68, closing body 60 is also fixed stationarily in relation to housing 12 in recess 62 of piston 10. On the side of piston 10 facing away from mixed fluid inlet 4, recess 62 is closed by means of a plate 74 to which a handle member 28 is attached. Closing body 60 is thus substantially integrated in piston 10 in such a way that it cannot be accessed from outside suction device 1. Plate 74 is fixed to bores 73 in piston 10 (see also FIGS. 10a-10c).

In its rear section 10b, the piston has a continuous, slot-shaped recess 80 (see FIGS. 10a-10c in particular). Screw 68, which functions as a holding member and by means of which closing body 60 is fixed to housing 12, extends through said recess 80. In conjunction with screw 68, recess 80 thus acts as a slotted guide for piston 10. At three points, the slot-shaped recess 80 has indentations 81, 82, 83 that serve as detent positions (see FIGS. 10a-10c). Screw 68 latches into these indentations 81, 82, 83 when the respective position is reached. In order to support such locking into place, a spring 70 is disposed in a recess in the rear section 66 of closing body 60, between closing body 60 and a holding section 72 on plate 74. By means of this spring 70, which is in the form of a pressure spring, piston 10 is biased away from mixed fluid inlet 4 so that screw 68 can lock into indentation 81, 82, 83. Spring 70 also serves to compensate for any play in the longitudinal direction of the constriction member or piston 10.

On the circumferential surface of piston 10, there is also disposed a circumferential groove 86 which serves as a receptacle for an O-ring or some other kind of seal. A circular groove 84 is also provided, which likewise serves as a receptacle for an O-ring for sealing the piston against mixed fluid outlet 8 when piston 10 is in the third position.

Figure 7:
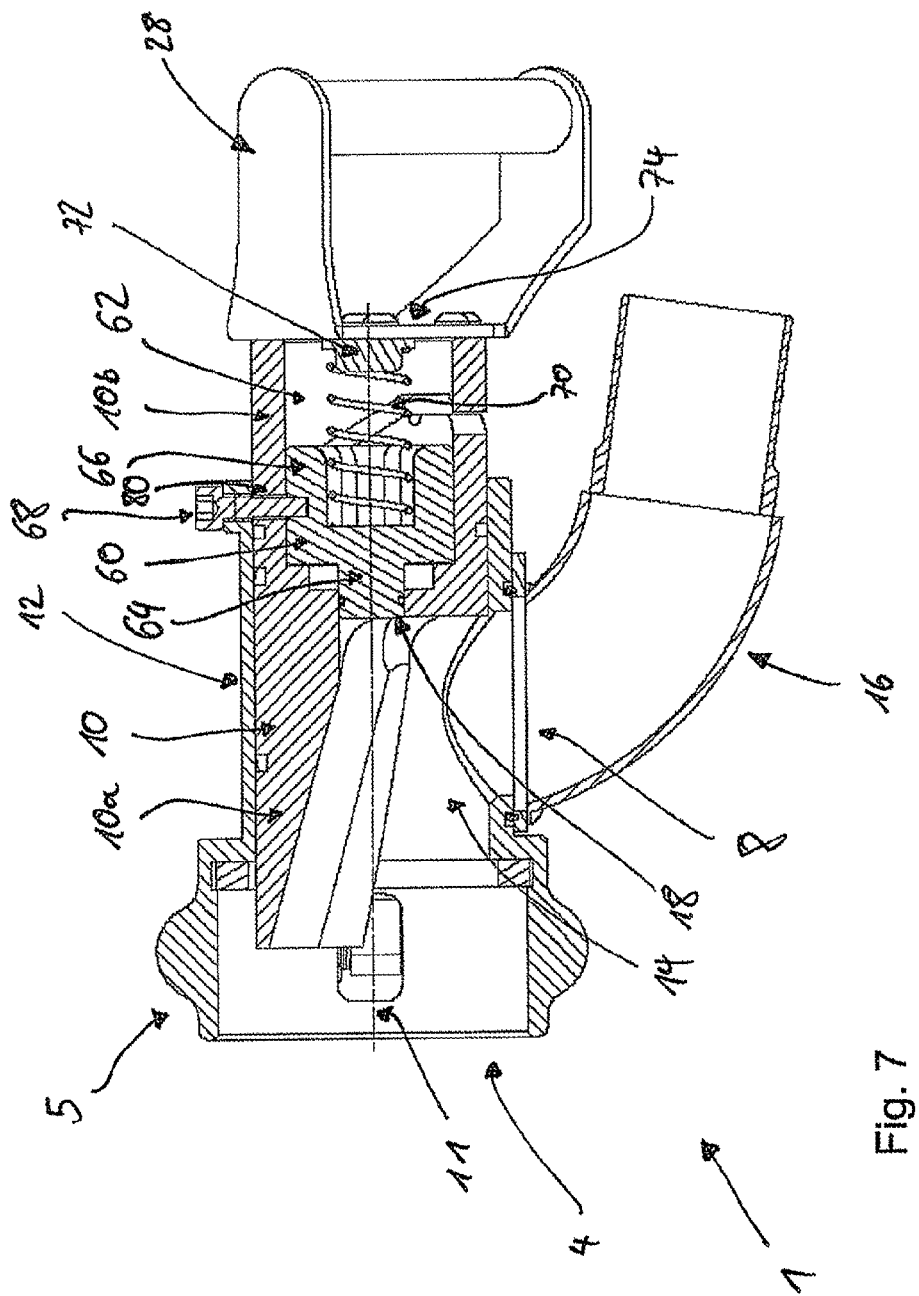
FIG. 7 shows a cross-sectional view of a suction device according to another embodiment and in the first position.

The operation of the suction device according to this embodiment shall now be described with reference to FIGS. 7-10c. Prior to coupling, suction device 1 is closed and piston 10 is in its third position (as shown in FIG. 9). In said position, screw 68 latches into indentation 83, and piston 10 is in such a position relative to closing body 60 that air channel 20 is not completely closed. Air can thus be exchanged to a certain extent, which makes it easier to connect to coupling 5. In position 3, alternatively, air channel 20 can be closed by closing body 60. Piston 10 is now turned by means of handle member 28 to the first position in order to open mixed fluid outlet 8 (as shown in FIG. 7). In the process, screw 68 latches into indentation 81. Mixed fluid outlet 8 is completely opened, and flow channel 14 is not constricted. In this position, closing body 60 closes air inlet 18 by means of plug-like protrusion 64. Thus, in this first position, no additional slurp air is added.

Figure 8:
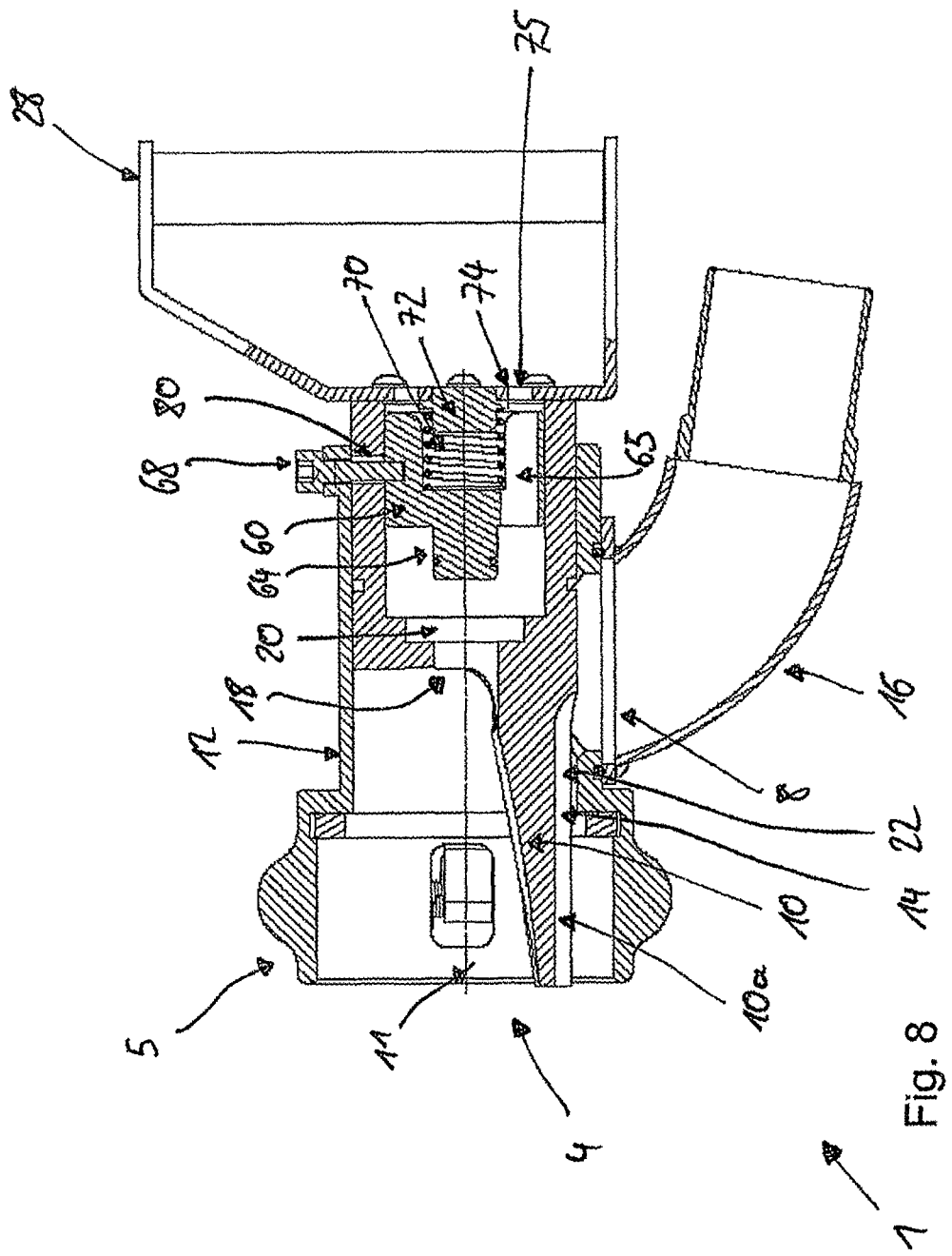
FIG. 8 shows a cross-sectional view of the suction device in FIG. 7, in the second position.
Figure 9:
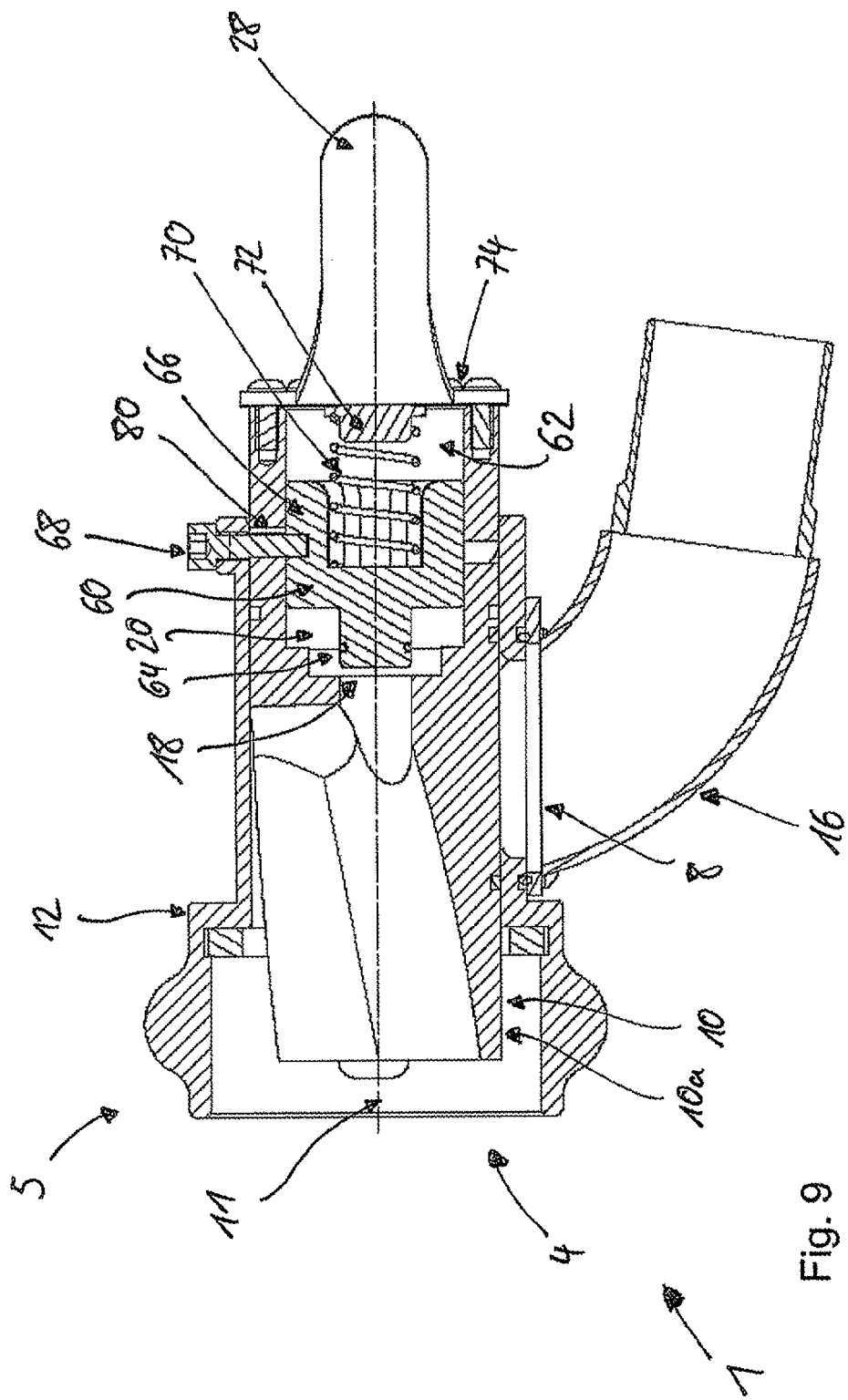
FIG. 9 shows a cross-sectional view of the suction device in FIGS. 7 and 8, in the third position.

If the collecting tank has been sucked almost completely empty, piston 10 is brought by means of handle member 28 into the second position (as shown in FIG. 8), i.e., into the slurp position. In this position, flow channel 14 is constricted, and groove 22 on piston 10 forms a wall of flow channel 14. Screw 68 latches into indentation 82. Piston 10 is in such a position relative to closing body 60 that air inlet 18 is completely released and additional slurp air flows through an opening 75 in plate 74, through a passageway 65 in the closing body and through air channel 20 into the interior of suction device 1, thus acting as slurp air. This position is ideally kept for at least two seconds, or better for approximately three seconds (or longer). Piston 10 is then brought back into the third position by means of handle member 28, until screw 68 latches into indentation 83. Suction device 1 can then be disconnected.

The detent position (82) may be omitted, alternatively, or replaced by a deflection of such a kind that the "sniffing" position (the second position) cannot be skipped without overcoming an obstacle. This can be realized, for example, with a change of contour or angle in the slotted guide, which is adapted so that visual feedback is produced when screw 68 is moved along the deflection.

The invention claimed is:
1. A suction device for removing a mixed fluid from a collecting tank, comprising:

a mixed fluid inlet for receiving the mixed fluid, said mixed fluid inlet being fluidically connectable to a connection port of said collecting tank, a mixed fluid outlet for discharging the mixed fluid, said mixed fluid outlet being fluidically connectable to a suction line, a flow channel extending between said inlet and said outlet, further comprising (a) a constriction member which is adapted to reduce a cross-section of the flow channel in at least a section thereof, wherein the constriction member can be moved relative to at least one of the inlet or the outlet into a first and a second position, the cross-section of the flow channel being less when the constriction member is in the second position than when the constriction member is in the first position, and (b) an air inlet which opens into the flow channel and which can be released or blocked for selectively feeding air into said flow channel, and wherein the air inlet is formed as a recess in the constriction member and is connected to an air passageway in the constriction member, which air passageway can be released or blocked.

2. The suction device according to claim 1,
further comprising a housing which has a housing opening in fluidic communication with the air inlet when the constriction member is in the second position.

3. A suction device for removing a mixed fluid from a collecting tank, comprising:
a mixed fluid inlet for receiving the mixed fluid, said mixed fluid inlet being fluidically connectable to a connection port of said collecting tank,
a mixed fluid outlet for discharging the mixed fluid, said mixed fluid outlet being fluidically connectable to a suction line,
a flow channel extending between said inlet and said outlet, further comprising (a) a constriction member which is adapted to reduce a cross-section of the flow channel in at least a section thereof, wherein the constriction member can be moved relative to at least one of the inlet or the outlet into a first and a second position, the cross-section of the flow channel being less when the constriction member is in the second position than when the constriction member is in the first position, and (b) an air inlet which opens into the flow channel and which can be released or blocked for selectively feeding air into said flow channel, and (c) a closing body for selectively releasing or blocking the air inlet and which can be moved back and forth between an open position and a closed position.

4. The suction device according to claim 3,
wherein the closing body is stationarily fixed to a housing of the device.

5. The suction device according to claim 4,
wherein the closing body is connected via a holding member to the housing and the holding member, together with a recess on the constriction member, forms a slotted guide for said constriction member, such that said constriction member can effectively be moved relative to the housing and the closing body.

6. The suction device according to claim 3,
wherein the closing body is disposed at least partially in a recess in the constriction member.

7. The suction device according to claim 3,
wherein a longitudinal axis of the closing body is arranged substantially coaxially with a longitudinal axis of the constriction member.

8. A suction device for removing a mixed fluid from a collecting tank, comprising:
a mixed fluid inlet for receiving the mixed fluid, said mixed fluid inlet being fluidically connectable to a connection port of said collecting tank,
a mixed fluid outlet for discharging the mixed fluid, said mixed fluid outlet being fluidically connectable to a suction line,
a flow channel extending between said inlet and said outlet, further comprising (a) a constriction member which is adapted to reduce a cross-section of the flow channel in at least a section thereof, wherein the constriction member can be moved relative to at least one of the inlet or the outlet into a first position, a second position, and a third position, the cross-section of the flow channel being less when the constriction member is in the second position than when the constriction member is in the first position, and (b) an air inlet which opens into the flow channel and which can be released or blocked for selectively feeding air into said flow channel, and
wherein the constriction member can be locked by snap-locking means in at least one of the first position, the second position, or the third position.

9. A suction station for removing a mixed fluid from a collecting tank, comprising:
a holding tank for the mixed fluid,
a suction line for feeding the mixed fluid to the holding tank,
a conveyor unit adapted to generate underpressure in the suction line and to convey the mixed fluid through the suction line into the holding tank, and
a suction device connected to the suction line, for removing the mixed fluid from the collecting tank, said suction device comprising:
a mixed fluid inlet for receiving the mixed fluid, said mixed fluid inlet being fluidically connectable to a connection port of said collecting tank,
a mixed fluid outlet for discharging the mixed fluid, said mixed fluid outlet being fluidically connectable to a suction line, and
a flow channel extending between said inlet and said outlet,
further comprising a constriction member which is adapted to reduce a cross-section of the flow channel in at least a section thereof, wherein the constriction member can be moved relative to at least one of the inlet or the outlet into a first and a second position, the cross-section of the flow channel being less when the constriction member is in the second position than when the constriction member is in the first position, and an air inlet which opens into the flow channel and which can be released or blocked for selectively feeding air into said flow channel, wherein the air inlet is formed as a recess in the constriction member and is connected to an air passageway in the constriction member, which air passageway can be released or blocked.

10. A method for removing a mixed fluid from a collecting tank by means of a suction device comprising a mixed fluid inlet for receiving the mixed fluid, said mixed fluid inlet being fluidically connectable to a connection port of said collecting tank, a mixed fluid outlet for discharging the mixed fluid, said mixed fluid outlet being fluidically connectable to a suction line, and a flow channel extending between said inlet and said outlet, further comprising a constriction member which is adapted to reduce a cross-section of the flow channel in at least a section thereof, wherein the constriction member can be moved relative to at least one of the inlet or the outlet into a first and a second position, the cross-section of the flow channel being less when the constriction member is in the second position than when the constriction member is in the first position, and an air inlet which opens into the flow channel and which can be released or blocked for selectively feeding air into said flow channel, wherein the air inlet is formed as a recess in the constriction member and is connected to an air passageway in the constriction member, which air passageway can be released or blocked, said method comprising the steps of:
coupling the suction device to a connection port of the collecting tank;
sucking the mixed fluid out of the collecting tank by means of underpressure;
reducing a cross-section of the flow channel, in at least a section thereof, by means of a constriction member of the suction device; and
decoupling the suction device.

11. The method according to claim 10,
further comprising the step of:
closing the flow channel by means of the constriction member before the step of decoupling the suction device.

12. The method according to claim 10,
wherein at least one of the steps of reducing the cross-section of the flow channel or closing the flow channel comprises moving the constriction member.

13. The method according to claim 12,
wherein the step of moving the constriction member comprises at least one of turning or sliding the constriction member.

14. The method according to claim 13,
wherein the step of reducing the cross-section comprises the step of sliding the constriction member, and the step of closing the flow channel comprises the step of turning the constriction member.

15. The method according to claim 10,
further comprising the step of:
selectively feeding air into the flow channel by releasing and blocking an air inlet.

* * * * *